United States Patent
Wang et al.

(10) Patent No.: US 8,068,413 B2
(45) Date of Patent: Nov. 29, 2011

(54) OVERLOAD CONTROL METHOD FOR ACCESS MEDIA GATEWAY AND CORRESPONDING ACCESS MEDIA GATEWAY

(75) Inventors: Weiyang Wang, Shenzhen (CN); Xiaoshuang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 979 days.

(21) Appl. No.: 12/019,706

(22) Filed: Jan. 25, 2008

(65) Prior Publication Data

US 2008/0117809 A1  May 22, 2008

Related U.S. Application Data (63) Continuation of application No. PCT/CN2006/001692, filed on Jul. 17, 2006.

(30) Foreign Application Priority Data

Jul. 27, 2005  (CN) .......................... 2005 1 0036255

(51) Int. Cl.
*H04J 1/16* (2006.01)

(52) U.S. Cl. .... 370/229; 370/230; 370/252; 370/395.43

(58) Field of Classification Search ............. 370/229, 370/235, 252, 389, 338, 352, 395.4, 230, 370/449, 232, 469, 356, 350; 709/226, 229, 709/249, 224, 232, 227, 235; 379/112.04, 379/112.06, 112.07, 162, 218.01, 88.17, 379/201.01, 27.02, 29.02, 221.09; 455/436, 455/69, 67.13
See application file for complete search history.

(56) References Cited

U.S. PATENT DOCUMENTS 5,450,483 A * 9/1995 Williams ................. 379/112.04
(Continued)

FOREIGN PATENT DOCUMENTS

CN  1489353 A  4/2004
(Continued)

OTHER PUBLICATIONS

"Gateway control protocol: Media gateway overload control package; H.248.11 (Nov. 2002)" ITU-T Standard in Force (I), International Telecommunication Union, Geneva, CH, No. 29, Nov. 2002 XP017401370.

(Continued)

*Primary Examiner* — Aung S Moe
*Assistant Examiner* — Abdullah Riyami
(74) *Attorney, Agent, or Firm* — Conley Rose, P.C.; Grant Rodolph (57) ABSTRACT

The present invention provides an overload control method for an access media gateway and the corresponding access media gateway. The access media gateway restricts call of a subscriber coupled thereto and acting as a calling side or a called side. Different overload levels and calls with high priority to be guaranteed for the respective overload levels are set at the access media gateway. The subscriber of the access media gateway acting as a calling side or a called side determines an overload level upon detection of its own overload, judges whether the call is a call with high priority to be guaranteed for the overload level. If it is a call with high priority to be guaranteed for the overload level, the call is processed in accordance with a normal call flow; otherwise, the call is rejected. The present invention protects an AG system from breakdown at a high traffic load, and efficiently guarantees connection of the call with high priority including an emergency call and/or a call via a subscriber port with high priority, which can reduce dependence on the MGC, prevent the MGC from overload and rapidly alleviate the overload of the AG, so that the time period in which the service is influenced is shortened.

7 Claims, 1 Drawing Sheet

U.S. PATENT DOCUMENTS

| | | | |
|---|---|---|---|
| 6,405,250 B1* | 6/2002 | Lin et al. | 709/224 |
| 6,463,286 B1* | 10/2002 | Salminen | 455/453 |
| 6,907,462 B1* | 6/2005 | Li et al. | 709/226 |
| 7,765,294 B2* | 7/2010 | Edwards et al. | 709/224 |
| 2001/0038690 A1* | 11/2001 | Palmer et al. | 379/218.01 |
| 2002/0159576 A1 | 10/2002 | Adams | |
| 2002/0176405 A1* | 11/2002 | Aijala | 370/352 |
| 2003/0169751 A1* | 9/2003 | Pulkka et al. | 370/401 |
| 2004/0008824 A1* | 1/2004 | Resuta | 379/27.02 |
| 2004/0090989 A1* | 5/2004 | Kobayashi | 370/469 |
| 2004/0165529 A1 | 8/2004 | Lee | |
| 2004/0240389 A1* | 12/2004 | Bessis et al. | 370/252 |
| 2005/0070230 A1* | 3/2005 | Das et al. | 455/69 |
| 2005/0080905 A1* | 4/2005 | Dolinar et al. | 709/227 |
| 2006/0036737 A1* | 2/2006 | Kumar et al. | 709/226 |
| 2006/0045016 A1* | 3/2006 | Dawdy et al. | 370/235 |
| 2006/0212594 A1* | 9/2006 | Haner et al. | 709/232 |
| 2006/0251231 A1* | 11/2006 | Arai | 379/162 |
| 2007/0025341 A1* | 2/2007 | Baigal et al. | 370/352 |
| 2007/0070989 A1* | 3/2007 | Savoor et al. | 370/356 |
| 2007/0165828 A1* | 7/2007 | Ma et al. | 379/221.09 |
| 2007/0171823 A1* | 7/2007 | Hunt et al. | 370/232 |
| 2008/0002669 A1* | 1/2008 | O'Brien et al. | 370/352 |
| 2008/0037532 A1* | 2/2008 | Sykes et al. | 370/389 |
| 2008/0104251 A1* | 5/2008 | Xu et al. | 709/227 |
| 2008/0267064 A1* | 10/2008 | Broadhurst et al. | 370/230 |
| 2009/0185555 A1* | 7/2009 | Hue et al. | 370/352 |
| 2010/0011118 A1* | 1/2010 | Chang et al. | 709/235 |
| 2010/0069080 A1* | 3/2010 | Benveniste | 455/450 |

FOREIGN PATENT DOCUMENTS

| | | |
|---|---|---|
| CN | 1571574 A | 1/2005 |
| DE | 10341071 | 3/2005 |

OTHER PUBLICATIONS

Albrecht Schwarz Alcatel Germany: "H.Sup.BHCoA—Proposal of Overload Control Model(s) for H..248 Access Gateways" ITU-T Draft Study Period 2005-2008, International Telecommunication Union, Geneva, CH, vol. Study Group 16, Jul. 26, 2005, pp. 1-4, XP017408005.

Christian Groves LM Ericsson Sweden: "H.248.1: Informative MGC Overload Call Flows" ITU-T Draft Study Period 2005-2008, International Telecommunication Union, Geneva, CH, vol. Study Group 16, Jul. 26, 2005, pp. 1-13, XP017407913.

European Search Report—dated Jul. 15, 2008; Application No./ Patent No. 06753145.9-2413 / 1906589 PCT/CN2006001692.

Third European Office Action dated Oct. 29, 2010 Appln. No. 06 753 145.9-2412.

The English Translation Written Opinion of the International Search Authority Appln. No. PCT/CN2006/001692, Nov. 16, 2006.

First Office Action regarding the Chinese Priority Document Appln. No. 200510036255.4, Nov. 30, 2007.

Second Office Action regarding European Counterpart Application No. 06 753 145.9-2413, Aug. 3, 2010.

International Telecommunication Union-ITU-T Telecommunication Standardization Sector of ITU H.248.11, "Series H: Audiovisual and Multimedia Systems Infrastructure of audiovisual services—Communication procedures, Gateway control protocol: Media gateway overload control package", Nov. 2002, 24 pages.

International Telecommunication Union ITU-T Telecommunication Standardization Sector of ITU, H.248 Sub-Series Implementors' Guide, Series H: Audiovisual and Multimedia Systems Infrastructure of audiovisual series—Communication procedures, Implementors' Guide for the H.248 Sub-series of Recommendation ("Media Gateway Control Protocol"), Nov. 26, 2004.

Zhang Yunyong, et al; "Maximum running revenue based parlay gateway overload control", Journal on communications, vol. 26, No. 3, Mar. 2005, pp. 92-107.

International Search Report—PCT/CN2006/001692—Mailed Nov. 16, 2006.

* cited by examiner

Fig.1

OVERLOAD CONTROL METHOD FOR ACCESS MEDIA GATEWAY AND CORRESPONDING ACCESS MEDIA GATEWAY

The present application is a continuation application of PCT/CN2006/001692 filed on Jul. 17, 2006, entitled as "AN OVERLOAD CONTROL METHOD FOR THE ACCESS MEDIA GATEWAY AND AN ACCESS MEDIA GATEWAY", which claims the priority of the Chinese Patent Application No. 200510036255.4 filed on Jul. 27, 2005. The contents of the application are incorporated by reference herein in their entirety.

FIELD OF THE INVENTION

The present invention relates to the field of communication technologies, and in particular to an overload control method for an access media gateway and the corresponding access media gateway.

BACKGROUND OF THE INVENTION

With the increasing scale of the commercial application of the Next Generation Network (NGN), reliability of NGN devices shall be guaranteed sufficiently. Since subscriber traffic is undetermined and processing capability of a device is limited, a situation where the traffic brings a load beyond normal processing capability of the device, i.e. an overload, may occur frequently. If the overload results in a partial or complete malfunction of the device, services may be interrupted. Consequently, overload control capability of a device, i.e. ability to operate under overload condition, is a crucial factor with influence upon reliability of the device and even reliability of the network.

The NGN includes a Media Gateway Controller (MGC), a Media Gateway (MG), a Signaling Gateway (SG), a relevant application server, etc. The media gateway includes an Access media Gateway (AG) and a Trunk media Gateway (TG). The AG provides a subscriber side interface connected with subscriber end equipment such as a telephone, terminates signaling of subscriber line and interacts with the MGC through H.248 or MGCP protocol to convert a media stream. The MGC is responsible for call control and controls the AG through the H.248 or MGCP protocol to set up and release a media stream connection.

The call processing capability of the AG and the MGC are limited due to restriction factors such as the CPU operation speed of a system and the like. The system shall be designed in a way that the call processing capability of the system can satisfy a demand for a normal traffic load. For instance, if one AG is provided with a capacity of 2000 line POTS subscribers, each subscriber has an average traffic of 0.1 erlan and each call lasts for 60 s in average, then the AG has an average traffic of 200 erlan and the call processing capability needs to reach 3.3 CAPS (Call Attempts Per Second), that is, 3.3 calls are processed per second. However, in many cases such as in holiday or busy period of a day, the subscriber traffic is typically far beyond 0.1 erlan and thus exceeds the normal processing capability of the system. In order to ensure normal operation of the system and a normal service under a large traffic load, an overload control mechanism is provided for a device to prevent the system from breakdown due to an impact of the large traffic and to guarantee the service as far as possible, in addition to a margin reserved in the system design to satisfy a demand for a high load (for instance, if the average traffic for a subscriber is 0.1 erlan, the system is designed in terms of 0.2 erlan).

The overload control for an AG device is actually to perform restriction for subscriber calls when the load of the system reaches a threshold, so as to make the load of the system resume to a normal level as soon as possible and thereby prevent the breakdown of the system. Such an approach for restricting subscriber calls will necessarily influence the subscriber service during an overload. How to minimize the influence upon the subscriber service depends upon the selection of call restriction policy. A subscriber coupled to an AG device may be an ordinary resident subscriber, or may be a commercial subscriber or a government subscriber, and different subscribers have different requirements for service reliability. A subscriber call coupled to an AG device may be an ordinary call, or may be an emergency call such as a call for ambulance, a call for police and the like, and different calls also have different requirements for service reliability. Therefore, a key technology in the overload control for the AG device lies in that a reasonable handling mechanism and call restricting policy shall be studied to guarantee a call with high priority during an overload as far as possible.

In a first approach of the prior art, multiple overload levels are set at the AG device, and each of the levels corresponds to a certain system load. For instance, three overload levels are set, where an overload at the first level corresponds to a CPU occupancy rate of 70%, an overload at the second level corresponds to a CPU occupancy rate of 85%, and an overload at the third level corresponds to a CPU occupancy rate of 95%.

A ratio of the subscribers whose calls are restricted in the overload at the respective levels is set at the AG device. The system initiates call restriction dependent upon the ratio for call restriction when the overload of the system reaches a certain level. For instance, in the case of the overload control of three levels, 50% subscriber calls are restricted for the overload at the first level, 70% subscriber calls are restricted for the overload at the second level, and all subscriber calls are restricted for the overload at the third level. 50% or 70% subscriber calls are selected randomly and restricted during call restriction. For instance, for restricting 50% calls, five calls per ten calls are rejected, and for restricting 70% calls, seven calls per ten calls are rejected.

For the case that a subscriber coupled to the AG device acts as a calling side, when the AG detects a hook-off by the subscriber, the AG judges whether to restrict the call dependent upon a current overload level. If it is judged to restrict the call, the call is directly rejected and a busy tone or a notification tone is played to the subscriber. Otherwise, the hook-off event is reported to the MGC through the H.248/MGCP, and the call is handled in accordance with normal call flow.

For the case that a subscriber coupled to the AG device acts as a called side, when the AG receives an Add command sent by the MGC, the AG judges whether to restrict the call dependent upon a current overload level. If it is judged to restrict the call, the call is rejected in a Reply message sent to the MGC. Otherwise, the call is accepted in the Reply message sent to the MGC, and the call is handled in accordance with the normal call flow.

The first approach in the prior art may be disadvantageous in that any call is restricted uniformly dependent upon the set ratio of the call restriction during the overload of the AG device without distinguishing priorities of calls. Although this may protect the system from breakdown under the impact of a large traffic, no guarantee can be presented for a call with high priority, which results in that the call with high priority may fail even in the case of a slight overload.

In a second approach of the prior art, multiple overload levels are set at the AG device, and each of the levels corresponds to a certain system load. For instance, three overload levels are set, where an overload at the first level corresponds to a CPU occupancy rate of 70%, an overload at the second level corresponds to a CPU occupancy rate of 85%, and an overload at the third level corresponds to a CPU occupancy rate of 95%.

The call restriction policy for the overload of the AG is set at the MGC device. The call restriction policy may be call restriction as per subscriber proportion, or may be call restriction as per call priority with priority set for a subscriber or calling number.

When the AG detects its own overload, overload information of the AG is reported to the MGC in a gateway overload control packet of the H.248.11.

The AG rejects all calls during an overload at the highest level, and performs process in accordance with the normal call flow during an overload at other levels without initiation of the call restriction. Upon reception of the overload information reported by the AG, the MGC restricts calls from a calling side and a called side of the AG dependent upon the preset call restriction policy.

Though the second approach in the prior art can guarantee a call with high priority, it still has the following disadvantages.

1. The AG does not perform call restriction substantially. The call restriction primarily depends on the MGC, which poses high functional requirement as well as intercommunication requirement on the MGC.

2. The AG does not perform call restriction substantially, but reports numerous subscriber hook-off messages to the MGC, which brings a large impact upon the MGC and tends to result in the overload of the MGC.

3. Since the AG still performs process in accordance with the normal call flow during an overload (except an overload at the highest level) and there are still a large number of messages interacted between the AG and the MGC, it is not easy to alleviate the overload of the AG, thereby normal access to the service will be affected for a long period of time.

SUMMARY OF THE INVENTION

The technical problem addressed by the present invention is to overcome the disadvantages of the existing overload control method for the AG device that, when guaranteeing a call with high priority, the tasks of the MGC is too heavy which tends to cause an overload of the MGC, and the overload of the AG can not be easily alleviated. The present invention provides an overload control method for an AG device which not only preferentially guarantees the connection of the call with high priority, but also reduces dependence on the MGC, so as to prevent the MGC from an overload and rapidly alleviate the overload of the AG to shorten the time period in which the service is influenced.

Technical solutions adopted in the present invention to address the above technical problem are as follows.

In such an overload control method for an access media gateway, the AG device restricts a call of a subscriber coupled thereto and acting as a calling side. The method comprises A). setting, at the access media gateway, different overload levels and a call with high priority to be guaranteed for the respective overload levels; B). determining, by the access media gateway, an overload level after the subscriber coupled thereto and acting as a calling side initiates a call and the access media gateway detects its own overload; and C). judging, by the access media gateway, whether the call is a call with high priority to be guaranteed for the overload level, and if it is, reporting a hook-off event and processing the call in accordance with a normal call flow; otherwise, rejecting the call directly.

Preferably, the call with high priority is a preset emergency call, and an emergency call digitmap is configured at the access media gateway or an emergency call digitmap is sent from a media gateway controller to the access media gateway upon startup of a system.

Preferably, in C), the access media gateway buffers the hook-off event, plays a dial tone directly to a subscriber port, receives a number and compares the number with an emergency call digitmap to judge whether the call is an emergency call. If they do not match, it is judged that the call is an ordinary call and a busy tone or a notification tone is played directly to the subscriber port to release the call. If they match, it is judged that the call is an emergency call. For an emergency call, the access media gateway reports the hook-off event to the media gateway controller. The media gateway controller sends a normal digitmap to the access media gateway upon reception of the hook-off event and instructs the access media gateway to play the dial tone to the calling subscriber port. The access media gateway compares the buffered number with the received normal digitmap and processes the call in accordance with the normal call flow, that is, if they match, the number is reported to the media gateway controller, and if they do not match, the busy tone or the notification tone is played to the subscriber port to release the call.

Preferably, the call with high priority is a preset call via a subscriber port with high priority, and priority of the subscriber port is configured at the access media gateway. In C), it is judged whether the call is a call from the subscriber port with high priority through inquiring priority attribute of the subscriber port. For a call from the subscriber port with high priority, the hook-off event is reported to the media gateway controller and the call is processed in accordance with the normal call flow, otherwise, a busy tone or a notification tone is played to the subscriber port to release the call.

Preferably, the call with high priority is a preset emergency call and a call from a subscriber port with high priority. An emergency call digitmap is configured at the access media gateway or is sent from the media gateway controller to the access media gateway upon startup of a system. Priority of a subscriber port is also configured at the access media gateway. In C), it is judged sequentially whether the call is a call from a port with high priority or an emergency call. If the call is an emergency call or a call from a port with high priority, the hook-off event is reported to the media gateway controller and the call is processed in accordance with the normal call flow. If the call is neither a call from a port with high priority nor an emergency call, a busy tone or a notification tone is played to the subscriber port to release the call.

Optionally, the overload levels and overload thresholds are configured at the access media gateway. The access media gateway judges whether there is an overload and determines the overload level dependent upon the preset overload levels and the overload thresholds.

The present invention provides an overload control method for an access media gateway. The access media gateway restricts a call of a subscriber coupled thereto and acting as a called side. The method comprises a). setting, at the access media gateway, different overload levels and a call with high priority to be guaranteed for the respective overload levels; b). determining, by the access media gateway, an overload level after receiving a call of the subscriber coupled thereto and acting as a called side and detecting its own overload; and c). judging whether the call is a call with high priority to be guaranteed for the overload level, and if it is, processing the call in accordance with the normal call flow; otherwise, indicating rejection of the call to the media gateway controller.

Preferably, in c), the media gateway controller judges in advance whether the call is an emergency call based on called number analysis and then sets emergency call identifier or context priority of a context in a message transmitted to the access media gateway. The access media gateway detects the emergency call identifier or the context priority of the context. If the emergency call identifier is set or the context priority is set as high priority, the call is a call with high priority, and the call is processed in accordance with the normal call flow. If the emergency call identifier is not set or the context priority is set as low priority, the access media gateway rejects the call in a reply message transmitted to the media gateway controller.

Preferably, in c), the access media gateway inquires priority attribute of a called subscriber port dependent upon terminal identifier of the called subscriber. If the called subscriber port is a port with high priority, the call is processed in accordance with the normal call flow; otherwise, the call is rejected in a reply message transmitted to the media gateway controller.

Preferably, in c), the media gateway controller analyzes and judges in advance whether the call is an emergency call dependent upon a called number and then sets emergency call identifier or context priority of a context in a message transmitted to the access media gateway. The access media gateway sequentially judges whether the call is a call with high priority dependent upon the emergency call identifier or the context priority and priority attribute of a subscriber port. If the emergency call identifier is set, or the context priority is set as high priority, or the called subscriber port is a port with high priority, the call is processed in accordance with the normal call flow; otherwise, the call is rejected in a reply message transmitted to the media gateway controller.

Preferably, if the access media gateway or the media gateway controller supports a gateway overload control packet of H.248.11, the access media gateway overloaded reports overload information of the access media gateway to the media gateway controller through the gateway overload control packet of the H.248.11. The media gateway controller directly initiates a corresponding call restriction policy for a call to the access media gateway dependent upon an overload level of the called access media gateway to restricts calls in proportion or preferentially guarantee a call with high priority. If the call restriction policy is to preferentially guarantee the call with high priority, the media gateway controller rejects an ordinary call directly and sets, for the call with high priority, emergency call identifier or the context priority of a context as high priority.

The access media gateway provided by the present invention includes a storage module adapted to store different overload levels and a call with high priority to be guaranteed for the respective overload levels; an overload level determination module adapted to determine an overload level upon detection of an overload of the access media gateway; and a calling side's call restriction module, when a subscriber coupled to the access media gateway and acting as a calling side initiates a call, adapted to judge whether the call is a call with high priority to be guaranteed for the overload level, and if it is, to report a hook-off event and process the call in accordance with a normal call flow; otherwise, to reject the call directly.

Preferably, the access media gateway provided by the present invention further includes a called side's call restriction module. When the access media gateway receives a call to a subscriber coupled thereto and acting as a called side, the access media gateway judges whether the call is a call with high priority to be guaranteed for the overload level. If it is a call with high priority to be guaranteed for the overload level, the access media gateway processes the call in accordance with a normal call flow; otherwise, the access media gateway notifies a media gateway controller of rejection of the call.

The access media gateway provided by the present invention includes a storage module adapted to store different overload levels and a call with high priority to be guaranteed for the respective overload levels; an overload level determination module adapted to determine an overload level upon detection of an overload of the access media gateway; and a called side's call restriction module, when the access media gateway receives a call to a subscriber coupled thereto and acting as a called side, adapted to judge whether the call is a call with high priority to be guaranteed for the overload level, and if it is, to process the call in accordance with a normal call flow; otherwise, to notify a media gateway controller of rejection of the call.

Preferably, the access media gateway provided by the present invention further includes a calling side's call restriction module. When a subscriber coupled to the access media gateway and acting as a calling side initiates a call, the access media gateway judges whether the call is a call with high priority to be guaranteed for the overload level. If it is a call with high priority to be guaranteed for the overload level, the access media gateway reports a hook-off event and processes the call in accordance with a normal call flow; otherwise, the access media gateway rejects the call.

A communication system provided by the present invention includes an access media gateway to which a subscriber acting as a called side or a calling side is coupled, a media gateway controller and a network management system which manages the access media gateway and the media gateway controller via a management interface. The access media gateway includes a storage module adapted to store different overload levels and a call with high priority to be guaranteed for the respective overload levels; an overload level determination module adapted to determine an overload level upon detection of an overload of the access media gateway; and a calling side's call restriction module, when a subscriber coupled to the access media gateway and acting as a calling side initiates a call, adapted to judge whether the call is a call with high priority to be guaranteed for the overload level, and if it is, to report a hook-off event and process the call in accordance with a normal call flow; otherwise, to reject the call.

A communication system provided by the present invention includes an access media gateway to which a subscriber acting as a called side or a calling side is coupled, a media gateway controller and a network management system which manages the access media gateway and the media gateway controller via a management interface. The access media gateway include a storage module adapted to store different overload levels and a call with high priority to be guaranteed for the respective overload levels; an overload level determination module adapted to determine an overload level upon detection of an overload of the access media gateway; and a called side's call restriction module, when the access media gateway receives a call to a subscriber coupled thereto and acting as a called side, adapted to judge whether the call is a call with high priority to be guaranteed for the overload level, and if it is, to process the call in accordance with a normal call flow; otherwise, to notify a media gateway controller of rejection of the call.

Advantageous effects of the present invention lie in that, the AG device of the present invention distinguishes priority of a call and the connection of a call with high priority is guaranteed preferentially when the AG device is overloaded, and the AG is configured with the call restriction policy to perform call restriction on its own initiative when being overloaded, so that dependence upon the MGC can be reduced or eliminated. When being overloaded, the AG takes the call restriction measure on its own initiative, and numerous subscriber hook-off messages are shielded to the MGC, so that the impact upon the MGC is reduced and the overload of the MGC is prevented, and also messages interacted with the MGC are reduced which lowers the load of the AG and the overload of the AG can be alleviated rapidly so as to shorten the time period in which the service is influenced.

DETAILED DESCRIPTION OF THE INVENTION

The invention will be further described in detail hereinafter in accordance with the drawings and embodiments.

The call restriction policy for the overload of the AG according to the present invention is to guarantee the connection of the call with high priority for the overload at a low level and to reject all calls for the overload at the highest level. The call with high priority may be only a preset emergency call, such as 110, 119, 120, etc, or may be only a preset call via a subscriber port with high priority, or may include the emergency call and the call via the subscriber port with high priority.

The AG restricts calls dependent upon the overload level and the priority of a call. For instance, if the call restriction for a two-level overload is adopted, the connection of the call with high priority (the emergency call and/or the call via a subscriber port with high priority) is guaranteed and the ordinary call is rejected for the overload at the first level, and all calls are rejected for the overload at the second level. If the call restriction for a three-level overload is adopted, the connection of all calls with high priority (the emergency call and/or the call via a subscriber port with high priority) is guaranteed and the ordinary call is rejected for the overload at the first level, the call with the highest priority is guaranteed for the overload at the second level, and all calls are rejected for the overload at the third level.

Figure 1:
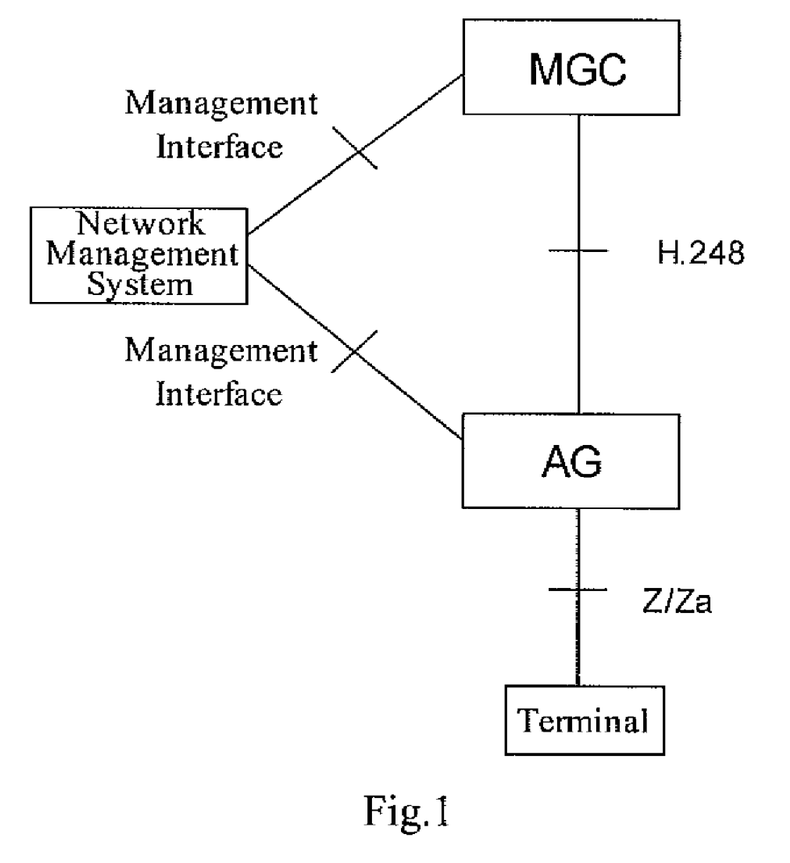
FIG. 1 is a basic topological diagram of a network.

As illustrated in FIG. 1 showing a basic topology diagram of a network, a network management system or a command line terminal manages the MGC and the AG via a management interface. Overload levels and overload thresholds are set by default in the AG system, or the overload levels and the overload thresholds are configured at the AG via the management interface. For instance, three overload levels are set and the overload is detected dependent upon the CPU occupancy rate with the threshold for the overload at the first level being the CPU occupancy rate of 70%, the threshold for the overload at the second level being the CPU occupancy rate of 85%, and the threshold for the overload at the third level being the CPU occupancy rate of 95%.

An emergency call digitmap is configured at the AG via the management interface or is obtained from the MOC upon startup of the AG system. This emergency call digitmap includes only a dial schema for the emergency call, such as 119, 110, 120, etc, and has the same data structure as a normal digitmap except for their contents. For instance, an emergency call digitmap is 11x|12x, and a normal digitmap is [2-8]xxxxxx|13xxxxxxxxx |0xxxxxxxxx|1[0124-9]x|E|F|x.F. If the emergency call digitmap is configured at the AG, it is irrelevant to the MGC. If the emergency call digitmap is configured at the MGC, the cooperation between the MGC and the AG in protocol and flow is required.

Priority for a subscriber port of the AG is configured via the management interface. For instance, the port connected with an ordinary resident subscriber is configured with a low priority, and the port connected with a government organization subscriber or an important commercial subscriber is configured with high priority. The AG processes a call through a mechanism as follows.

1. A subscriber coupled to the AG device acts as a calling side.

Upon detection of the hook-off of the subscriber, the AG firstly judges whether the system is overloaded dependent upon the preset overload levels and the overload thresholds (the AG inquires current usage of the system resource such as the CPU occupancy rate to judge whether the system is overloaded). If the system is not overloaded, the AG performs process in accordance with the normal call flow. If overloaded, the AG adopts a corresponding call restriction policy dependent upon the overload level. The call restriction policy of the AG includes the following three types.

(1) Guaranteeing the Connection of the Emergency Call a. If the call restriction policy is to guarantee the connection of the emergency call, the AG buffers the hook-off event, plays a dial tone directly to the subscriber port, receives the number and compares the received number with the emergency call digitmap. If they do not match, it is judged that the call is an ordinary call and the busy tone or the notification tone is played directly to the subscriber port to release the call. If they match, it is judged that the call is an emergency call.

b. For an emergency call, the AG buffers the number and reports to the MGC the hook-off event though a Notify command.

c. Upon reception of the hook-off event, the MGC sends a digitmap to the AG through a Modify command and instructs the AG to play the dial tone to the calling subscriber port.

Stored at the AG is a digitmap dedicated for judgment on whether a call is an emergency call. At this time, the digitmap sent by the MGC is a normal digitmap which shall include the dial schema for an ordinary call and an emergency call, and the AG is actually provided with two digitmaps.

It is specified in a standard call flow that a dial tone shall be played at this time. However, since in the present invention the AG receives and analyzes the number on its own initiative during the overload, the dial tone is not played under the control of the MGC, but directly played in advance. Therefore, there is no need to play the dial tone as instructed by the MGC at this time.

d. Since the AG has received the number, the AG only compares the buffered number with the received digitmap upon reception of the Modify command and then performs process in accordance with the normal call flow. If they match, the AG reports the number to the MGC through the Notify command. If they do not match, the AG plays the busy tone or the notification tone to the subscriber port to release the call.

A normal digitmap contains all allowed dial schemas including those for an emergency call and an ordinary call. Since the first match has been checked against the emergency call digitmap and the ordinary call has been filtered out, the second match with the normal digitmap is actually to match the contents of the emergency call. The second match is only directed to perform abnormality protection, in other words, to prevent the emergency call digitmap and the corresponding contents of the normal digitmap from being inconsistent. The final result depends on the comparison result of the calling number and the normal digitmap sent by the MGC.

(2) Guaranteeing the Connection of a Call from a Port with High Priority

If the call restriction policy is to guarantee the connection of a call from a port with high priority, the AG inquires the priority attribute of the hook-off port. If the hook-off port is a port with high priority, the hook-off event is reported to the MGC through the Notify command, and the call is processed in accordance with the normal call flow. If the hook-off port is an ordinary port, the busy tone or the notification tone is played to the subscriber port directly to release the call.

(3) Guaranteeing Both the Connection of an Emergency Call and the Connection of a Call from a Port with High Priority If the call restriction policy is to guarantee both the connection of an emergency call and the connection of a call from a port with high priority, the AG firstly inquires the priority attribute of the hook-off port. If the hook-off port is a port with high priority, the hook-off event is reported to the MGC through the Notify command, and the call is processed in accordance with the normal call flow. If the hook-off port is an ordinary port, the call is processed further in accordance with the above call flow for guaranteeing the connection of an emergency call.

2. A subscriber coupled to the AG device acts as a called side.

When a called AG is overloaded, a calling AG may not be overloaded, the calling AG may not necessarily initiate call restriction. The overload control mechanism of the AG involves two cases in which the subscriber coupled to the overloaded AG acts as a calling side and a called side, and the two cases can be used in combination.

If the AG or the MGC supports the gateway overload control packet of the H.248.11, the AG overloaded reports the overload information of the AG to the MGC with the gateway overload control packet of the H.248.11, and the MGC initiates a corresponding call restriction policy for a call to the AG dependent upon the overload level of the AG. The call restriction policy of the MGC may be call restriction by proportion, or may be to preferentially guarantee a call with high priority. If the call restriction policy is to preferentially guarantee a call with high priority, the MGC rejects an ordinary call directly, and sets the emergency call identifier of a context or sets context priority as high priority for a call with high priority. If the MGC does not support the call restriction function for the overloaded AG, the MGC processes all calls in accordance with the normal flow, and the AG accomplishes call restriction independently for a subscriber coupled thereto and acting as a called side.

The emergency call identifier and the context priority are attribute of the context in the H.248. The context priority is used to indicate a sequential order in which the MG processes the contexts, and the emergency call identifier is used to instruct the MG to preferentially process a call with the emergency call identifier. The MGC transmits to the AG an Add message to create a context and sets relevant attribute of the context (including the emergency call identifier or the context priority), and the AG judges whether the call is a call with high priority dependent upon the emergency call identifier or the context priority of the context. Because the AG can not analyze the called number while the subscriber of the AG acting as a called side, the AG can not judge whether a call is an emergency call and thus the MGC is required to identify the call. The method through which the MGC identify the call is to set emergency call identifier or context priority of a context.

The case in which a subscriber of the AG acts as a called side has been described here. If the MGC supports the call restriction for an overloaded AG, the number of calls to the called AG can be reduced, and thus the load of the called AG can be reduced even if the called AG has no function of the call restriction. The call restriction of the called AG and the call restriction of the MGC can be utilized independent of each other, in other words, both the call restriction of the MGC plus the call restriction of the called AG and absence of the call restriction of the MGC plus the call restriction of the called AG are applicable, but final call restriction effect will vary dependent upon the selection of policy for the absence of the call restriction of the MGC or the call restriction of the MGC.

If the AG or the MGC does not support the gateway overload control packet of the H.248.11, the AG overloaded does not report the overload information to the MGC, and the AG accomplishes the call restriction independently for a subscriber coupled thereto and acting as a called side.

When the AG receives the Add command transmitted by the MGC, the AG firstly judges whether the system is overloaded dependent upon the preset overload levels and the overload thresholds (the AG inquires current usage of system resource such as CPU occupancy rate to judge whether the system is overloaded). If the system is not overloaded, the AG performs process in accordance with the normal call flow. If the system is overloaded, the AG initiates call restriction. The call restriction policy of the AG includes the following three types.

(1) Performing Call Restriction Dependent Upon the Emergency Call Identifier or the Context Priority When a subscriber of the AG acts as a called side, the AG cannot judge whether the call is an emergency call, while the MGC can judge whether the call is an emergency call through analyzing the called number and then sets the emergency call identifier or the context priority of the context in the Add message sent to the AG. The AG obtains the priority of the call dependent upon the emergency call identifier or the context priority of the context.

The AG detects the emergency call identifier or the context priority of the context (if the MGC has no function of the call restriction, it also may involve emergency call identifier or context priority. The MGC can set the emergency call identifier of the context of a call upon determination from the called number that the call is an emergency call). If the emergency call identifier is set or the context priority is set as high priority, the AG considers the call as a call with high priority and processes the call in accordance with the normal call flow. If the emergency call identifier is not set or the context priority is set as low priority, the AG considers the call as an ordinary call and rejects the call in a Reply message transmitted to the MGC.

(2) Performing Call Restriction Dependent Upon the Priority Attribute of the Subscriber Port If the MGC does not support the emergency call identifier and the context priority of the context, the AG inquires the priority attribute of the called subscriber port dependent upon terminal identifier of the called subscriber (the terminal identifier is a character string used for the MGC and the MG to identify uniquely a subscriber port). If the called subscriber port is a port with high priority, the AG processes the call in accordance with the normal call flow, and if the called subscriber port is an ordinary port, the AG rejects the call in the Reply message transmitted to the MGC.

For a subscriber of the AG acting as a called side, if the MGC supports the emergency call identifier and the context priority of the context, the priority of the subscriber port may not necessarily be set. The emergency call identifier or the context priority of the context identifies the priority of a call, and a call with high priority may involve two cases: the calling port being high priority and the called port being high priority. The inquiry of the AG about priority of the called port can only be applicable in the latter case. Therefore, the method in which the MGC sets the emergency call identifier or the context priority of the context is preferred relative to the method in which the AG inquires the priority of the called port. However, the MGC may possibly not support the emergency call identifier or the context priority of the context, the method to inquire the priority of the called port can be utilized in the invention to accommodate different cases.

(3) Performing Call Restriction Dependent Upon Both the Emergency Call Identifier or the Context Priority and the Priority Attribute of a Subscriber Port The AG firstly detects the emergency call identifier or the context priority of the context. If the emergency call identifier is set or the context priority is set as high priority, the AG considers the call as a call with high priority and processes the call in accordance with the normal call flow. If the emergency call identifier is not set, or the context priority is set as low priority, the AG further inquires the priority attribute of the called subscriber port dependent upon the terminal identifier of the called subscriber. If the called subscriber port is a port with high priority, the call is processed in accordance with the normal call flow. If the called subscriber port is an ordinary port, the AG rejects the call in the Reply message transmitted to the MGC. Possibly on the contrary, the AG first inquires the port and then detects the emergency call identifier. If the emergency call identifier is set, or the context priority is set as high priority, or the called subscriber port is a port with high priority, the call is processed in accordance with the normal call flow. If the call is not an emergency call and the port is not a port with high priority, the AG rejects the call in the reply message transmitted to the MGC.

The invention provides an overload control method for an AG device to protect an AG system from breakdown during high traffic load and guaranteeing effectively connection of a call with high priority (including an emergency call and/or a call from a subscriber port with high priority), which is of low correlation with an MGC, can be implemented independent of the MGC and has low requirement on interoperability with the MGC. During the high traffic load, numerous subscriber hook-off messages can be shielded to the MGC, so that impact upon the MGC can be reduced greatly and the MGC can be prevented effectively from being overloaded. Therefore, during the high traffic load, there are a few messages interacted with the MGC, which can rapidly alleviate the overload of the AG, so that the time period in which the service is influenced is short.

The present invention further provides an access media gateway including a storage module, an overload level determination module and a calling side's call restriction module.

The storage module stores different overload levels and high priority calls guaranteed for the respective overload levels. For instance, three overload levels are set, in which all calls with high priority (an emergency call and a call from a subscriber port with high priority) are guaranteed and an ordinary call is rejected for the overload at the first level, a call with the highest priority (an emergency call or a call from a subscriber port with high priority) is guaranteed for the overload at the second level, and all calls are rejected for the overload at the third level. The details are as described in the above method.

The overload level determination module determines the overload level upon detection of the overload of the access media gateway. For instance, the overload is detected dependent upon CPU occupancy rate in a way that a threshold for the overload at the first level is CPU occupancy rate of 70%, a threshold for the overload at the second level is CPU occupancy rate of 85%, and a threshold for the overload at the third level is CPU occupancy rate of 95%. The details are as described in the above method.

When a subscriber coupled to the access media gateway and acting as a calling side initiates a call, the calling side's call restriction module judges whether the call is a call with high priority to be guaranteed for the overload level. If it is a call with high priority to be guaranteed for the overload level, a hook-off event is reported and the call is processed in accordance with the normal call flow, otherwise, the call is rejected directly. The calling side's call restriction module stores the emergency call digitmap which can be configured in the calling side's call restriction module or can be obtained from the MGC upon startup of an AG system. The calling side's call restriction module can restrict the calling side's call by adopting call restriction policy such as guaranteeing the connection of an emergency call, guaranteeing the connection of a call from a port with high priority, guaranteeing the connection of both an emergency call and a call from a port with high priority. The details are as described in the above method.

The access media gateway according to the present invention can further include a storage module, an overload level determination module and a called side's call restriction module.

The storage module is as described in the above description of the storage module in the access media gateway.

The overload level determination module determines an overload level upon detection of the overload of the access media gateway. The details are as described in the above description of the overload level determination module in the access media gateway.

When the access media gateway receives a call of a subscriber coupled thereto and acting as a called side, the called side's call restriction module judges whether the call is a call with high priority to be guaranteed for the overload level. If it is a call with high priority to be guaranteed for the overload level, the call is processed in accordance with the normal call flow, otherwise, the media gateway controller is notified of rejection of the call. The called side's call restriction module can restrict a called side's call by adopting call restriction policy such as call restriction dependent upon emergency call identifier or context priority, call restriction dependent upon priority attribute of a subscriber port, call restriction dependent upon both the emergency call identifier or the context priority and the priority attribute of the subscriber port. The details are as described in the above method.

The access media gateway can only include the storage module, the overload level determination module and the calling side's call restriction module. The access media gateway can also only include the storage module, the overload level determination module and the called side's call restriction module. The access media gateway can also include the storage module, the overload level determination module, the calling side's call restriction module and the called side's call restriction module.

Those skilled in the art can make various modifications to implement the present invention without departing from the spirit and scope of the present invention. The foregoing descriptions are merely illustrative of the preferred embodiments of the invention but not intended to limit the scope of the invention. All equivalent variations made in light of the description and the accompanying drawings of the present invention shall fall within the scope of the following claims.

What is claimed is:

1. An overload control method for an access media gateway, wherein the access media gateway restricts a call of a subscriber coupled thereto and acting as a calling side, the overload control method comprising:
   detecting, by the access media gateway, an overload of the access media gateway after the subscriber initiates a call, wherein the subscriber is acting as a calling side when the subscriber initiates the call;
   determining, by the access media gateway, an overload level; and
   determining, by the access media gateway, a corresponding call restriction policy dependent upon the overload level,
   wherein if the corresponding call restriction policy comprises a guaranteed connection of an emergency call, then the access media gateway buffers a hook-off event, plays a dial tone directly to a port of the subscriber, and compares a number received from the subscriber with an emergency call digitmap to determine whether the call is an emergency call,
   wherein if the number matches the emergency call digitmap, then the access media gateway determines that the call is an emergency call,
   wherein responsive to determining that the call is an emergency call, the method further comprises:
      reporting, by the access media gateway, the hook-off event to a media gateway controller;
      sending, by the media gateway controller, a normal digitmap to the access media gateway after receiving the hook-off event, wherein the media gateway controller instructs the access media gateway to play the dial tone to the calling subscriber port; and
      comparing, by the access media gateway, the buffered number with the received normal digitmap, wherein the access media gateway processes the call in accordance with a normal call flow.

2. The method according to claim 1, wherein the emergency call digitmap is configured at the access media gateway, or
   wherein the emergency call digitmap is sent from the media gateway controller to the access media gateway.

3. The method according to claim 1,
   wherein if: the corresponding call restriction comprises a guaranteed connection of a call from a preset subscriber port with high priority; and the high priority of the preset subscriber port is configured at the access media gateway, then the method further comprises:
      determining that the call is from the subscriber port with high priority through inquiring a priority attribute of the subscriber port, and
      reporting the hook-off event for the call from the subscriber port with high priority to a media gateway controller, wherein the call is processed in accordance with the normal call flow;
   otherwise, a busy tone or a notification tone is played to the subscriber port to release the call.

4. The method according to claim 1, wherein the overload level and one or more overload thresholds are configured at the access media gateway, wherein the access media gateway determines whether the overload has occurred, and wherein the access media gateway determines the overload level depending on one or more preset overload level and the overload thresholds.

5. An access media gateway, comprising:
   a storage module configured to store different overload levels and a call with high priority to be guaranteed for the respective overload levels;
   an overload level determination module configured to determine an overload level upon detection of an overload of the access media gateway; and
   a calling side's call restriction module configured to determine a corresponding call restriction policy dependent upon the overload level,
   wherein if the corresponding call restriction policy comprises a guaranteed connection of an emergency call, then the calling side's call restriction module is further configured to:
      buffer a hook-off event;
      play a dial tone directly to a port of a subscriber; and
      compare a number received from the subscriber with an emergency call digitmap to determine whether the call is an emergency call, wherein the call is determined to be an emergency call if the number matches the emergency call digitmap match; and
   wherein if the call is determined to be an emergency call, then the calling side's call restriction module is further configured to:
      report the hook-off event;
      receive a normal digitmap according to the hook-off event and an instruction to play the dial tone to the calling subscriber port;
      compare the buffered number with the received normal digitmap; and
      process the call in accordance with a normal call flow.

6. The access media gateway according to claim 5, further comprising: a called side's call restriction module,
   wherein if the access media gateway receives a call to a subscriber coupled thereto and acting as a called side, then the called side's call restriction module is configured to:
      determine whether the call comprises a high priority call that is guaranteed for the overload level; and
      process the call in accordance with a normal call flow when the call comprises a high priority call that is guaranteed for the overload level;
   otherwise, the called side's call restriction module is further configured to notify a media gateway controller that the call has been rejected.

7. A communication system comprising:
   an access media gateway;
   a subscriber coupled to the access media gateway, wherein the subscriber acts as a called side or a calling side;
   a media gateway controller; and
   a network management system configured to manage the access media gateway and the media gateway controller via a management interface,
   wherein the access media gateway is configured to:
      detect an overload of the access media gateway after the subscriber initiates a call;
      determine an overload level and a call restriction policy that is dependent upon the overload level; and
      determine if the call restriction policy comprises a guaranteed connection of an emergency call,
   wherein if the call restriction policy comprises a guaranteed connection of an emergency call, then the access media gateway is further configured to:
      buffer a hook-off event;

play a dial tone directly to a port of subscriber; and
compare a number received from a subscriber device with an emergency call digitmap to determine whether the call is an emergency call, wherein the call is determined to be an emergency call when the number matches the emergency call digitmap,
wherein if the call is determined to be an emergency, then the access media gateway is further configured to:
report the hook-off event to the media gateway controller;

receive a normal digitmap from the media gateway controller after reporting the hook-off event, wherein the media gateway controller instructs the access media gateway to play the dial tone to the calling subscriber port;
compare the buffered number with the normal digitmap after receiving the normal digitmap; and
process the call in accordance with a normal call flow.

* * * * *

UNITED STATES PATENT AND TRADEMARK OFFICE
CERTIFICATE OF CORRECTION

PATENT NO. : 8,068,413 B2
APPLICATION NO. : 12/019706
DATED : November 29, 2011
INVENTOR(S) : Weiyang Wang and Xiaoshuang Li It is certified that error appears in the above-identified patent and that said Letters Patent is hereby corrected as shown below:

Title Page, Item (30) Foreign Application Priority Data should be 200510036255.4

Signed and Sealed this
Tenth Day of January, 2012

David J. Kappos
*Director of the United States Patent and Trademark Office*